UNITED STATES PATENT OFFICE.

ALEXANDER S. RAMAGE, OF BUFFALO, NEW YORK, ASSIGNOR TO INTERNATIONAL COLOR & CHEMICAL COMPANY, INCORPORATED, OF DETROIT, MICHIGAN, A CORPORATION OF NEW YORK.

PROCESS OF PRODUCING LEAD PIGMENTS.

1,243,762. Specification of Letters Patent. Patented Oct. 23, 1917.

No Drawing. Application filed January 8, 1916. Serial No. 70,992.

*To all whom it may concern:*

Be it known that I, ALEXANDER S. RAMAGE, a subject of the King of Great Britain, residing at Buffalo, in the county of Erie and State of New York, have invented certain new and useful Improvements in Processes of Producing Lead Pigments, of which the following is a specification.

This invention is a process whereby lead pigments, including white lead, may be prepared directly from sulfid ores of lead, or from waste products containing lead sulfate.

According to the invention, lead sulfid ore is roasted under conditions to yield lead oxid and lead sulfate, the latter in the minimum practicable proportions. These roasting conditions are well understood in the art and need not therefore be described.

The roasted ore is then treated with a hot solution of sodium carbonate, a ten per cent. solution being suitable, used in sufficient excess to convert the lead sulfate to lead carbonate. In practice, it is found that sodium carbonate in about one-third excess over the amount required by theory is sufficient for this purpose. The solution containing sodium sulfate and the excess of sodium carbonate may be drawn off and employed in the treatment of another batch of ore.

The residue consisting essentially of lead oxid and lead carbonate is dissolved in a dilute solution of caustic soda. For this purpose a five per cent. solution of NaOH has been found suitable, used in such quantity that 100 parts of the said solution are present for each 2.8 parts of PbO in the lead-bearing product.

The resulting solution is clarified by settling and its lead contents are precipitated by carbon dioxid, preferably using for this purpose the gases derived from a lime kiln. The solution is heated to drive off any excess of carbon dioxid, and to insure that no bicarbonate remains in solution. The precipitated lead carbonate is then filtered off, thoroughly washed, and converted into basic carbonate by the addition of sodium hydroxid, (preferably a 2½ solution) in the proportion required by the equation:—

$$3PbCO_3 + 2NaOH = 2PbCO_3Pb(OH)_2 + Na_2CO_3.$$

The basic carbonate of lead or white lead thus produced is thoroughly washed and constitutes the immediate product of the process. The sodium carbonate solutions arising in the precipitation of the lead carbonate by carbon dioxid, and in the conversion of this lead carbonate to the basic salt by caustic soda, are combined, and causticized with lime. For this purpose, the lime from which the carbon dioxid has been driven off is available.

If desired, the white lead formed as above may be converted by appropriate further treatment into basic chromate of lead.

Instead of starting with a mixture of lead oxid and sulfate derived from a sulfid ore as aforesaid, I may use as a starting material the waste lead sulfate from sulfuric acid chambers or other sources.

I claim:—

1. The process of producing precipitated lead pigments which consists in reacting upon a material containing lead sulfate with an aqueous solution of a carbonate, thereby forming lead carbonate, dissolving the same in caustic alkali solution and re-precipitating lead carbonate by carbon dioxid.

2. The process of producing precipitated lead pigments which consists in roasting a sulfid ore of lead under conditions to form oxid and sulfate of lead, treating the roasted product with an aqueous solution of a carbonate and thereby converting the sulfate of lead into carbonate, dissolving the mixed oxid and carbonate in caustic alkali solution and re-precipitating lead carbonate by carbon dioxid.

3. The process of producing lead pigments which consists in reacting upon a material containing lead sulfate with an aqueous solution of a carbonate, thereby forming lead carbonate, dissolving the same in caustic alkali solution and re-precipitating by carbon dioxid, and thereafter converting the precipitated carbonate into a basic salt by treatment with caustic alkali.

4. The process of producing lead pigments which consists in roasting a sulfid ore of lead under conditions to form oxid and sulfate of lead, treating the roasted product with an aqueous solution of a carbonate and thereby converting the sulfate of lead into carbonate, dissolving the mixed oxid and carbonate in caustic alkali solution and re-precipitating by carbon dioxid, and thereafter converting the precipitated carbonate into a basic salt by treatment with caustic alkali.

In testimony whereof I affix my signature in presence of two witnesses.

ALEXANDER S. RAMAGE.

Witnesses:
FLORENCE JACOBI,
CHARLES FENN.